United States Patent
Miyata et al.

(10) Patent No.: US 6,837,516 B2
(45) Date of Patent: Jan. 4, 2005

(54) AIRBAG TRIGGER CONTROL SYSTEM

(75) Inventors: Yujiro Miyata, Toyota (JP); Tomoki Nagao, Nagoya (JP); Katsuji Imai, Nagoya (JP); Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 23 days.

(21) Appl. No.: 10/343,431

(22) PCT Filed: Aug. 2, 2001

(86) PCT No.: PCT/IB01/01376
§ 371 (c)(1),
(2), (4) Date: Jan. 31, 2003

(87) PCT Pub. No.: WO02/12029
PCT Pub. Date: Feb. 14, 2002

(65) Prior Publication Data
US 2004/0007860 A1 Jan. 15, 2004

(30) Foreign Application Priority Data
Aug. 3, 2000 (JP) ...................... 2000-236138

(51) Int. Cl.[7] .............................. B60R 21/32
(52) U.S. Cl. ..................................... 280/735
(58) Field of Search ................ 280/735, 734; 180/282; 701/45, 46

(56) References Cited
U.S. PATENT DOCUMENTS 6,070,113 A * 5/2000 White et al. ................. 701/45
6,371,515 B1 * 4/2002 Fujishima et al. ........... 280/735
6,636,788 B2 * 10/2003 Tamagawa et al. ........... 701/22

FOREIGN PATENT DOCUMENTS

| DE | 38 11 217 | 10/1989 | | |
|---|---|---|---|---|
| DE | 198 16 989 | 11/1999 | | |
| JP | 10-152014 | 11/1996 | | |
| JP | 11-286257 | 10/1999 | | |
| JP | 2000206144 A | * 7/2000 | ........... | G01P/21/00 |
| WO | WO97/48582 | 12/1997 | | |

* cited by examiner

Primary Examiner—Faye M. Fleming
(74) Attorney, Agent, or Firm—Kenyon & Kenyon

(57) ABSTRACT

An airbag trigger control system is provided with a first sensor which is disposed in a predetermined position in a vehicle body and outputs a signal corresponding to an impact exerted to the vehicle body, a trigger control system which triggers an airbag when a parameter determined on the basis of the signal output from the first sensor exceeds a predetermined threshold value, a second sensor which is disposed forward of the first sensor in the vehicle body and outputs a signal corresponding to an impact exerted to the vehicle body, and a threshold value changing device which changes the predetermined threshold value in accordance with the signal output by the second sensor. The second sensor outputs a predetermined signal at predetermined intervals, and the threshold value changing device changes the predetermined threshold value to a given value when the output signal of the second sensor is not detected in a predetermined number of successive control cycles.

9 Claims, 5 Drawing Sheets

AIRBAG TRIGGER CONTROL SYSTEM

BACKGROUND OF THE INVENTION

1. Field of the Invention

The invention relates in general to an airbag trigger control system, and more particularly to an airbag trigger control system suitable for appropriately triggering an airbag system for protecting occupants in a vehicle upon collision of the vehicle.

2. Description of Related Art

A known example of the conventional airbag trigger control system is disclosed in J-PA-11-286257. The disclosed airbag trigger control system includes a floor sensor disposed in a floor tunnel of a vehicle body. The floor sensor is operable to output a signal corresponding to an impact exerted to the floor tunnel. The airbag trigger control system is arranged to obtain control parameters on the basis of the output signals generated from the floor sensor and to control a trigger of the airbag system such that the airbag system is triggered when the obtained control parameters exceed a predetermined threshold value. In addition, the airbag trigger control system includes satellite sensors disposed in a front of the vehicle body, which are operable to generate output signals corresponding to the impact exerted to the front of the vehicle body. The airbag trigger control system is arranged to detect a magnitude of the impact exerted to the front of the vehicle body on the basis of the output signals generated from the satellite sensors, while being arranged to change the predetermined threshold value depending upon the detected magnitude of the impact, such that the threshold value decreases as the magnitude of the detected impact increases. Namely, the airbag becomes more likely to deploy as the magnitude of the impact exerted to the front of the vehicle body increases. Thus, the conventional airbag trigger control system is able to appropriately trigger the airbag system for protecting the occupants in the vehicle.

In the case where the satellite sensors become unavailable to properly output the signals corresponding to the impact exerted to the vehicle body, the threshold value used for the trigger control of the airbag system should not be determined on the basis of the output signals generated from the satellite sensors. In this case, the threshold value has to be changed to other threshold value for abnormal conditions so that the airbag system is appropriately triggered irrespective of the magnitude of the impact exerted to the front of the vehicle body.

One kind of the satellite sensor is capable of outputting a predetermined abnormality determination signal to an electronic control unit, upon detection of an abnormal state of the sensor. Thus, the airbag trigger control system with such satellite sensors is capable of determining whether the satellite sensors are in the abnormal condition. This facilitates determination of whether the threshold value used for triggering the airbag should be changed to a given value as the threshold value for the abnormal conditions.

In this respect, the threshold value for abnormal conditions is required to be selected in the following conditions: (a) the satellite sensors are incapable of generating abnormality determination signals due to drop in the supply voltage or the like; (b) the output signals corresponding to the impact exerted to the vehicle body are not applied from the satellite sensors to the electronic control unit due to disconnection of a signal line therebetween, or due to short-circuit occurred in the signal lines; and (c) the electronic control unit receives the signal that takes an unusual form which cannot be identified as the one corresponding to the impact exerted to the vehicle body. In the aforementioned conditions, however, it is not possible to determine the abnormal state of the satellite sensors on the basis of the abnormality determination signals generated thereby. The conventional airbag trigger control system does not take account at all of the needs for changing the threshold value for triggering the airbag to the given value as the threshold value for the abnormal conditions as indicated above.

SUMMARY OF THE INVENTION

It is an object of the invention to provide an airbag trigger control system capable of surely setting a threshold value used for triggering the airbag system to an appropriate value in any operating state of related sensors.

An airbag trigger control system includes a first sensor which is disposed in a predetermined position in a vehicle body and outputs a signal corresponding to an impact exerted to the vehicle body; a trigger control system which triggers an airbag when a parameter determined on the basis of the signal output from the first sensor exceeds a predetermined threshold value; a second sensor which is disposed forward of the first sensor in the vehicle body and outputs a signal corresponding to an impact exerted to the vehicle body; and a threshold value changing device which changes the predetermined threshold value in accordance with the signal output by the second sensor. The second sensor outputs a predetermined signal at predetermined intervals, and the threshold value changing device changes the predetermined threshold value to a given value when the output signal of the second sensor is not detected in a predetermined number of successive control cycles.

An airbag trigger control system includes a first sensor which is disposed in a predetermined position in a vehicle body and outputs a signal corresponding to an impact exerted to the vehicle body; a trigger control system which triggers an airbag when a parameter determined on the basis of the signal output from the first sensor exceeds a predetermined threshold value; a second sensor which is disposed forward of the first sensor in the vehicle body and outputs a signal corresponding to an impact exerted to the vehicle body; and a threshold value changing device which changes the predetermined threshold value in accordance with the signal output by the second sensor. The second sensor outputs a predetermined signal at a predetermined interval, and the threshold value changing device changes the predetermined threshold value to a given value when the output signal of the second sensor is not detected for a predetermined period of time.

The second sensor generates a signal corresponding to the impact exerted to the vehicle and also generates a predetermined signal at a predetermined interval. When a predetermined signal of the second sensor is not detected in a predetermined number of successive control cycles or for a predetermined period of time, the predetermined threshold value for triggering the airbag is changed to a given value as the threshold value. This makes it possible to reliably change the predetermined threshold value for triggering the airbag system to the given value as the threshold value for abnormal conditions, even in the state where the output signal of the second sensor becomes unavailable owing to such conditions, for example, when the second sensor becomes incapable of generating a signal representing abnormality thereof, and when the output signal generated from the second sensor corresponding to the impact exerted to the vehicle body cannot be detected due to disconnection of the signal line connecting between the second sensor and the electronic control unit, or the like.

After the predetermined threshold value is changed to the given value, when the predetermined signal of the second sensor is detected for a predetermined period of time, the threshold value does not have to be kept to be the given value. In this case, the threshold value is suitably returned to the value corresponding to the impact exerted to the vehicle, which is determined on the basis of the output signal of the second sensor.

The airbag trigger control system is provided with a change canceling device which cancels a change of the threshold value to the given value when the output signal of the second sensor is detected in a predetermined number of successive control cycles after the threshold value changing device changes the predetermined threshold value to the given value.

An airbag trigger control system includes a first sensor which is disposed in a predetermined position in a vehicle body and outputs a signal corresponding to an impact exerted to the vehicle body; a trigger control system which triggers an airbag when a parameter determined on the basis of the signal output from the first sensor exceeds a predetermined threshold value; a second sensor which is disposed forward of the first sensor in the vehicle body and outputs a signal corresponding to an impact exerted to the vehicle body; a threshold value changing device which changes the predetermined threshold value in accordance with the signal output by the second sensor; an abnormality determination device which determines an abnormality in the output signal of the second sensor each time the output signal is detected. The threshold value changing device changes the predetermined threshold value to the given value when the abnormality in the output signal of the second sensor is detected by the abnormality determination device in a predetermined number of times or for a predetermined period of time.

According to the invention, it is determined whether the detected output signal of the second sensor has abnormality each time the output signal is detected. When the output signal of the second sensor is not detected in a predetermined number of successive control cycles or for a predetermined period of time, the predetermined threshold value for the airbag trigger control is changed to the given value. This arrangement makes it possible to reliably change the predetermined threshold value for triggering the airbag to the given value on condition that the output signal of the second sensor is unavailable or has abnormality, e.g., the output signal of the second sensor takes an unusual form that cannot be identified as the signal corresponding to the impact exerted to the vehicle.

Meanwhile, after the predetermined threshold value is changed to the given value, when the output signal without abnormality of the second sensor is detected for a predetermined time period, the threshold value does not have to be kept to be the given value. In this case, it is suitable to return the given value to the threshold value corresponding to the impact exerted to the vehicle.

In the apparatus according to the invention, the threshold value for the airbag trigger control can be set to an appropriate given value even in the condition that prevents the setting of the threshold value, for example, a certain failure in the output signal of the second sensor.

Meanwhile, the given value may be returned to the predetermined threshold value in the condition that allows the setting of the threshold value corresponding to the output signal of the second sensor.

DETAILED DESCRIPTION OF PREFERRED EMBODIMENT

Figure 1:
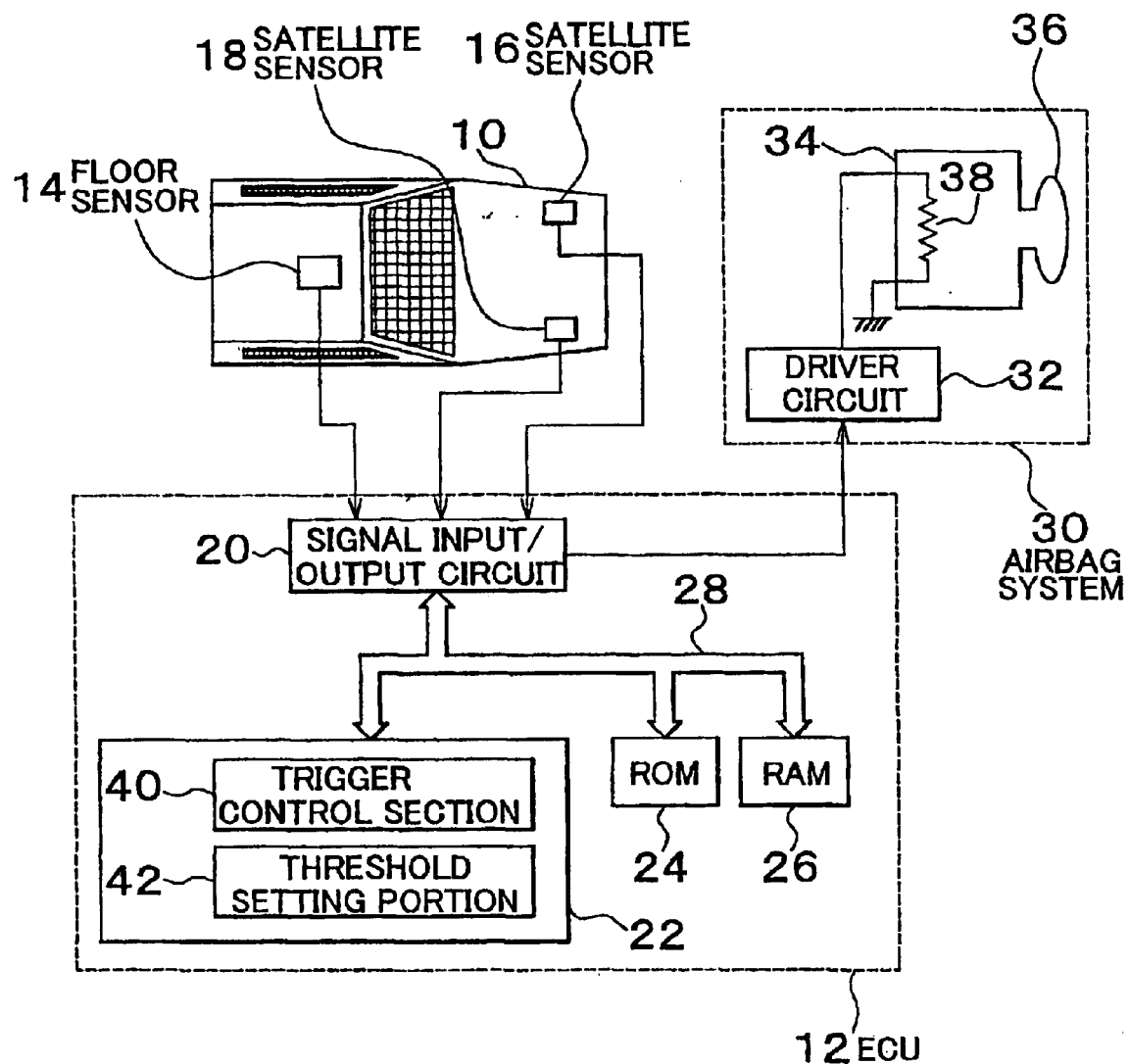
FIG. 1 is a schematic diagram illustrating an airbag trigger control system according to a preferred embodiment of the invention.

FIG. 1 schematically shows an airbag trigger control system according to a preferred embodiment of the invention. The airbag trigger control system of this embodiment includes an electronic control unit (hereinafter referred to as an "ECU") 12, which is installed in a vehicle 10. The airbag trigger control system operates under control of the ECU 12.

The airbag trigger control system of this embodiment further includes a floor sensor 14 and satellite sensors 16, 18. The floor sensor 14 is disposed in the vicinity of a floor tunnel located in a longitudinally intermediate portion of the vehicle 10, while the satellite sensors 16, 18 are respectively disposed in a left-side member and a right-side member located in the front of the vehicle 10. The floor sensor 14 and the satellite sensors 16, 18 may be electronic deceleration sensors, which are adapted to output signals corresponding to a magnitude of an impact exerted to respective portions of the vehicle 10 to which these sensors are disposed. More specifically, these electronic deceleration sensors are adapted to output signals corresponding to a magnitude of deceleration in the running direction of the vehicle 10 (hereinafter referred to as a "level signal"). Each of the floor sensor 14 and the satellite sensors 16, 18 has a self-diagnostic function and outputs a signal indicating the normal state or abnormal state thereof (hereinafter referred to as a "normality/abnormality determination signal") at a predetermined interval, together with the level signal. After the level signal and the normality/abnormality determination signal are generated, the satellite sensors 16, 18 output mirror signals symmetrical with the level and normality/abnormality determination signals, respectively.

The ECU 12 incorporates a signal input/output circuit 20, a central processing unit (hereinafter referred to as a "CPU") 22, a read-only memory (hereinafter referred to as a "ROM") 24 for storing processing programs and tables required for calculation, a random-access memory (hereinafter referred to as a "RAM") 26 serving as a working area, and a bi-directional bus 28 through which the above-mentioned components are connected with each other.

The aforementioned floor sensor 14 and the satellite sensors 16, 18 are connected to the input/output circuit 20. The signal input/output circuit 20 receives output signals from the floor sensor 14 and the satellite sensors 16, 18. These output signals are stored in the RAM 26 according to commands of the CPU 22. The ECU 12 detects a magnitude of deceleration Gf of the vehicle body on the basis of the output signal received from the floor sensor 14. The ECU 12 also detects each magnitude of decelerations $G_{SL}$, $G_{SR}$ of the front-left and front-right portions of the vehicle body, on the basis of the output signals received from the satellite sensors 16, 18. The ECU 12 further determines whether the floor and satellite sensors 14, 16, 18 are in abnormal conditions, on the basis of the normality/abnormality determination signals received from these sensors 14, 16, 18, which correspond to results of the self diagnoses of these sensors 14, 16, 18.

The airbag trigger control system of the airbag system according to the present embodiment includes an airbag system 30 installed in the vehicle 10 and being operable to protect occupants in the vehicle 10. The airbag system 30 includes a driver circuit 32, an inflator 34 and an airbag 36. The inflator 34 is equipped with an ignition device 38 connected to the driver circuit 32 and a gas generator (not shown) to be fired by heat of the ignition device 38 to generate a great amount of gas. The airbag 36 is deployed and inflated by the generated gas. The airbag 36 is installed in position so that the deployed airbag 36 is interposed between the occupant and the installed member or components of the vehicle 10.

The driver circuit 32 of the airbag system 30 is connected to the signal input/output circuit 20. The airbag system 30 is triggered to deploy the airbag 36 upon application of a drive signal from the input/output circuit 20 to the driver circuit 32. In the ECU 12, the CPU 22 functionally includes a trigger control section 40 and a threshold setting section 42. The trigger control section 40 of the CPU 22 calculates predetermined control parameters, which will be described later, according to the processing programs stored in the ROM 24, based on the deceleration Gf detected by the floor sensor 14. The trigger control section 40 of the CPU 22 then determines whether the obtained parameters exceed a predetermined threshold value SH. Based on the determination result, the trigger control section 40 of the CPU 22 controls application of the drive signal via the signal input/output circuit 20 to the driver circuit 32 of the airbag system 30. Meanwhile, the threshold setting section 42 of the CPU 22 adequately sets a predetermined threshold value SH on the basis of the decelerations $G_{SL}$, $G_{SR}$ detected on the basis of the output signals generated from the satellite sensors 16, 18.

The control routine executed by the CPU 22 according to the present embodiment will be hereinafter described.

Figure 2:
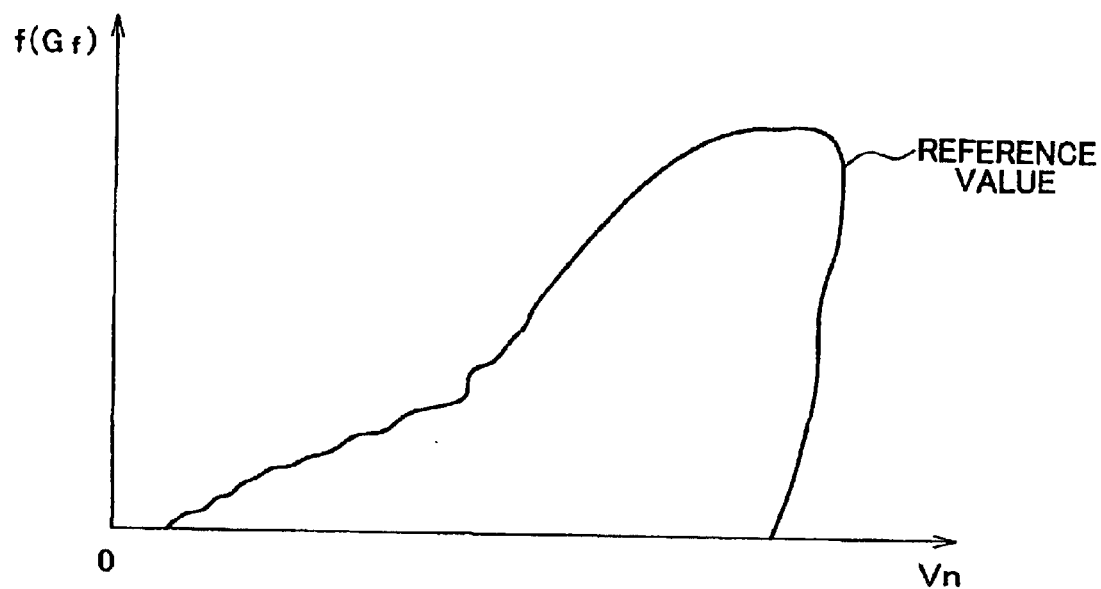
FIG. 2 is a graph illustrating plotting of the relationships between velocities Vn and calculated values f(Gf) obtained at predetermined time intervals.

In the present embodiment, the trigger control section 40 is adapted to perform a predetermined calculation on the deceleration Gf detected on the basis of the output signal of the floor sensor 14, to thereby obtain a calculated value f(Gf) and a velocity Vn. Described more specifically the velocity Vn is obtained by integrating the deceleration Gf with time. When the running vehicle 10 decelerates at deceleration Gf, an object (e.g., an occupant) therein is accelerated forward owing to an inertial force. Therefore, the velocity Vn of the object relative to the vehicle 10 is obtained by integrating the deceleration Gf with time. It should be appreciated that the calculated value f(Gf) may be the deceleration Gf itself or alternatively may be a value obtained by integrating the deceleration Gf with time. FIG. 2 shows a graph wherein relationships between the velocities Vn and the calculated values f(Gf) in a predetermined condition obtained at predetermined time intervals are plotted. After the calculated values of f(Gf) and the velocities Vn are obtained, the trigger control section 40 then compares a reference value defined by the relationship between the calculated value f(Gf) and the velocity Vn indicated in the graph of FIG. 2 with the threshold value SH obtained from a determination map currently selected by the threshold setting section 42.

Figure 3:
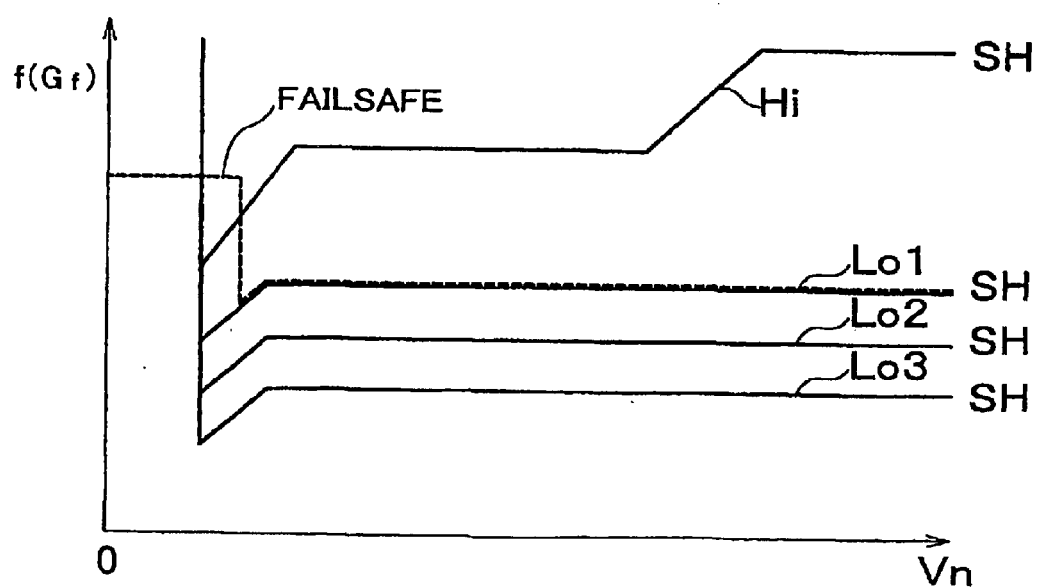
FIG. 3 is a graphical representation of one example of a change pattern of a threshold value SH, which functions as a determination map utilized for determining a relationship between the calculated value f(Gf) and the velocity Vn in the present embodiment.
Figure 4:
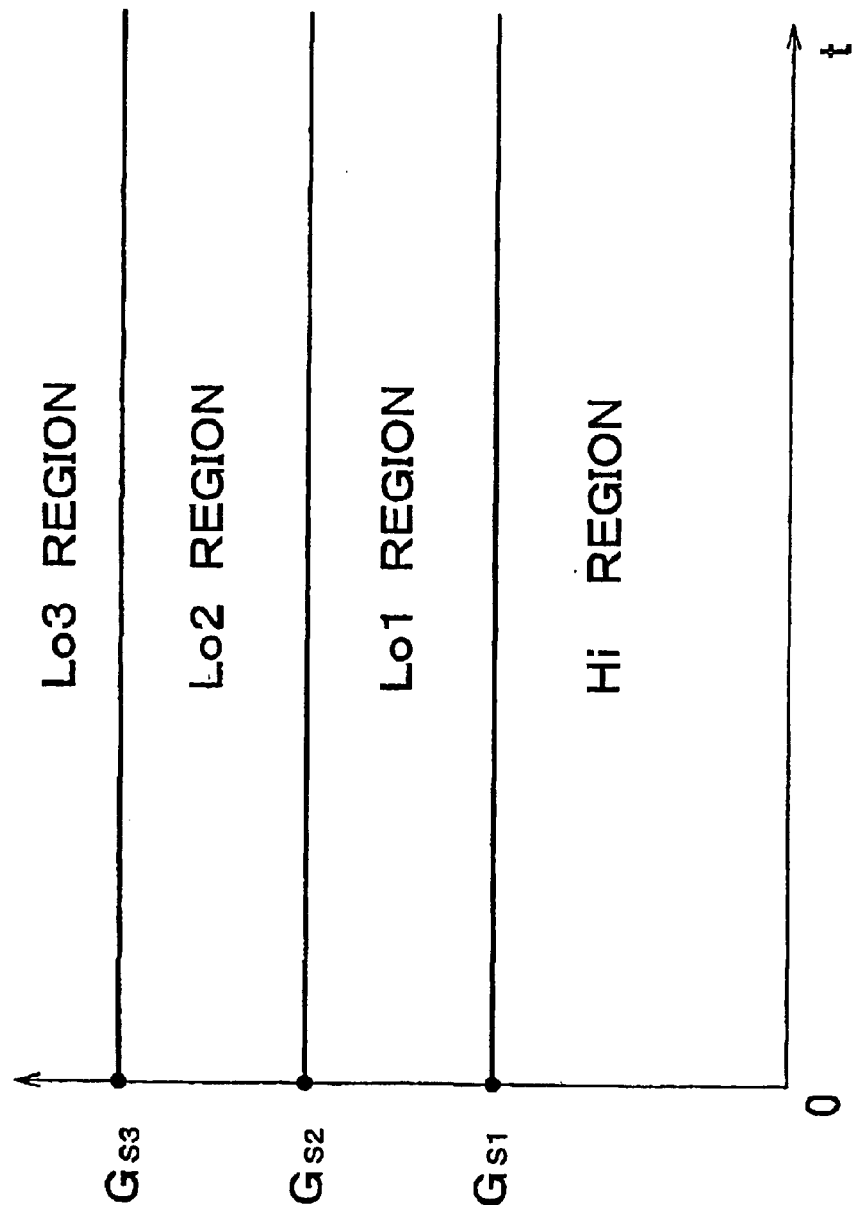
FIG. 4 is a view for explaining a manner of selecting an appropriate one of the change patterns of the threshold value SH employed in the preferred embodiment.

FIG. 3 shows a graphical representation of change patterns of the threshold value SH (hereinafter referred to as a "threshold-change-pattern") which function as the determination map used for determining the relationship between the calculated value f(Gf) and the velocity Vn. FIG. 3 represents five threshold-change-patterns, a Hi-map, a Lo1-map, a Lo2-map, a Lo3-map and a failsafe map are depicted. In this embodiment, the Hi map is used as a standard map, and the failsafe map is partially overlapped with the Lo1-map. Referring next to FIG. 4, a manner of selecting one of the threshold-change-patterns according to the present embodiment will be described.

In the present embodiment, the threshold setting section 42 of the CPU 22 stores in RAM 26 the selected one of the threshold-change-patterns each representing the relationship between the calculated value f(Gf) and the velocity Vn preliminarily obtained by experiments. Each of the threshold-change-pattern represents a boundary between the range where the trigger of the airbag system 30 is needed and the range where the trigger of the airbag system 30 is not needed. Such boundary is determined on the basis of the decelerations $G_{SL}$, $G_{SR}$ detected on the basis of the output signals generated from the satellite sensors 16, 18.

Described in detail, as the magnitude of the impact exerted to the front of the vehicle 10 increases, the possibility of a crash or a collision of the vehicle 10 becomes higher. Therefore, when the magnitude of impact exerted to the vehicle body increases, the threshold-change-pattern should be switched so that the trigger of the airbag system 30 is facilitated. In view of the above, the threshold setting section 42 of the present embodiment is arranged to select and set the appropriate threshold-change-pattern which ensures that the threshold value SH becomes smaller as the decelerations $G_{SL}$, $G_{SR}$ detected on the basis of the output signal generated from the satellite sensors 16, 18 increase. Detail explanations will now be provided with reference to FIG. 4. When the decelerations $G_{SL}$, $G_{SR}$ are smaller than a first predetermined value $G_{S1}$, the threshold setting section 42 selects the Hi map for the threshold-change-pattern. When the decelerations $G_{SL}$, $G_{SR}$ are not smaller than the first predetermined-value $G_{S1}$ and smaller than a second predetermined value $G_{S2}$, the threshold setting section 42 selects the Lo1-map. When the decelerations $G_{SL}$, $G_{SR}$ are not smaller than the second predetermined value $G_{S2}$ and smaller than a third predetermined value $G_{S3}$, the threshold setting section 42 selects the Lo2 map. When the decelerations $G_{SL}$, $G_{SR}$ are not smaller than the third predetermined value $G_{S3}$, the threshold setting section 42 selects the Lo3 map. In addition, the threshold setting section 42 has another option to select the failsafe map, upon detection of the failure in the satellite sensors 16, 18, the failure in the communication between the satellite sensors 16, 18 and the ECU 12, and the like. In the present embodiment, the larger one of the decelerations $G_{SL}$, $G_{SR}$ is used for the selection of the threshold-change-pattern, for example.

The trigger control section 40 compares the reference value determined by the relationship between the calculated value f(Gf) and the velocity Vn with the threshold value SH of the threshold-change-pattern selected and set by the threshold setting section 42. When the reference value exceeds or is larger than the threshold value SH, the threshold setting section 42 applies the drive signal to the driver circuit 32 of the airbag system 30 via the signal input/output circuit 20. In this case, the airbag system 30 is accordingly triggered to deploy the airbag 36.

According to the present embodiment, the threshold value SH for triggering the airbag system 30 is changed depending upon the magnitude of the impact exerted to the front of the vehicle body. Accordingly the trigger of the airbag system 30 is appropriately controlled depending upon types of the crash or collision of the vehicle 10, such as a head-on collision, offset crash and oblique impact. That is, the airbag system 30 is more likely to be triggered as the magnitude of impact exerted to the front of the vehicle body increases. Thus, the airbag trigger control system according to the present embodiment permits an appropriate trigger control of the airbag system 30.

In the present embodiment, when the normality/abnormality determination signals generated from the satellite sensors 16, 18 is detected to be in an abnormal state of the sensors, the threshold setting section 42 selects the failsafe map as the threshold-change-pattern. In this arrangement, the trigger control section 40 is able to compare the reference value obtained on the basis of the decelerations $G_{SL}$, $G_{SR}$ with the threshold value SH of the failsafe map subsequent to the detection of the abnormality of the satellite sensors 16, 18. This may result in an appropriate trigger of the airbag system 30.

In the above-described trigger control, when either the satellite sensor 16 or 18 is in an abnormal state, the abnormal state should be recognized by the satellite sensor 16 or 18 to generate the normality/abnormality determination signal such that the ECU 12 recognizes the abnormal state of the satellite sensor 16 or 18. However, the abnormal state that cannot be recognized by the satellite sensors 16, 18 or the ECU 12 may occur in the following conditions:

a) the satellite sensors 16, 18 cannot generate level signals or diagnose the abnormality due to drop in the supply voltage,
b) the signal line connecting between the satellite sensors 16, 18 and the ECU 12 is disconnected or electrically shorted, and
c) the normality/abnormality determination signal takes an unusual form that cannot be identified due to noise. In case of the above-described abnormalities, it is preferable to select the failsafe map for the threshold-change-pattern. In view of the above, the airbag trigger control system according to the present embodiment is arranged to select the failsafe map for the threshold-change-pattern upon detection of such abnormality that occurs between the satellite sensors 16, 18 and the ECU 12.

After the failsafe map is selected for the threshold-change-pattern, when the satellite sensors 16, 18 resume the function for detecting the abnormality by eliminating the cause by which the failsafe map is selected, for example, recovery of the supply voltage, the failsafe map does not have to be kept. In view of the above, the airbag trigger control system according to the present embodiment is arranged to return the threshold-change-pattern from the failsafe map to an appropriate one of the normal maps including Hi-, Lo1-, Lo2-, Lo3-maps when the cause for selecting the failsafe map is eliminated.

The features of the present embodiment will be described in detail with reference to FIGS. 5A–5C and 6.

Figure 5:
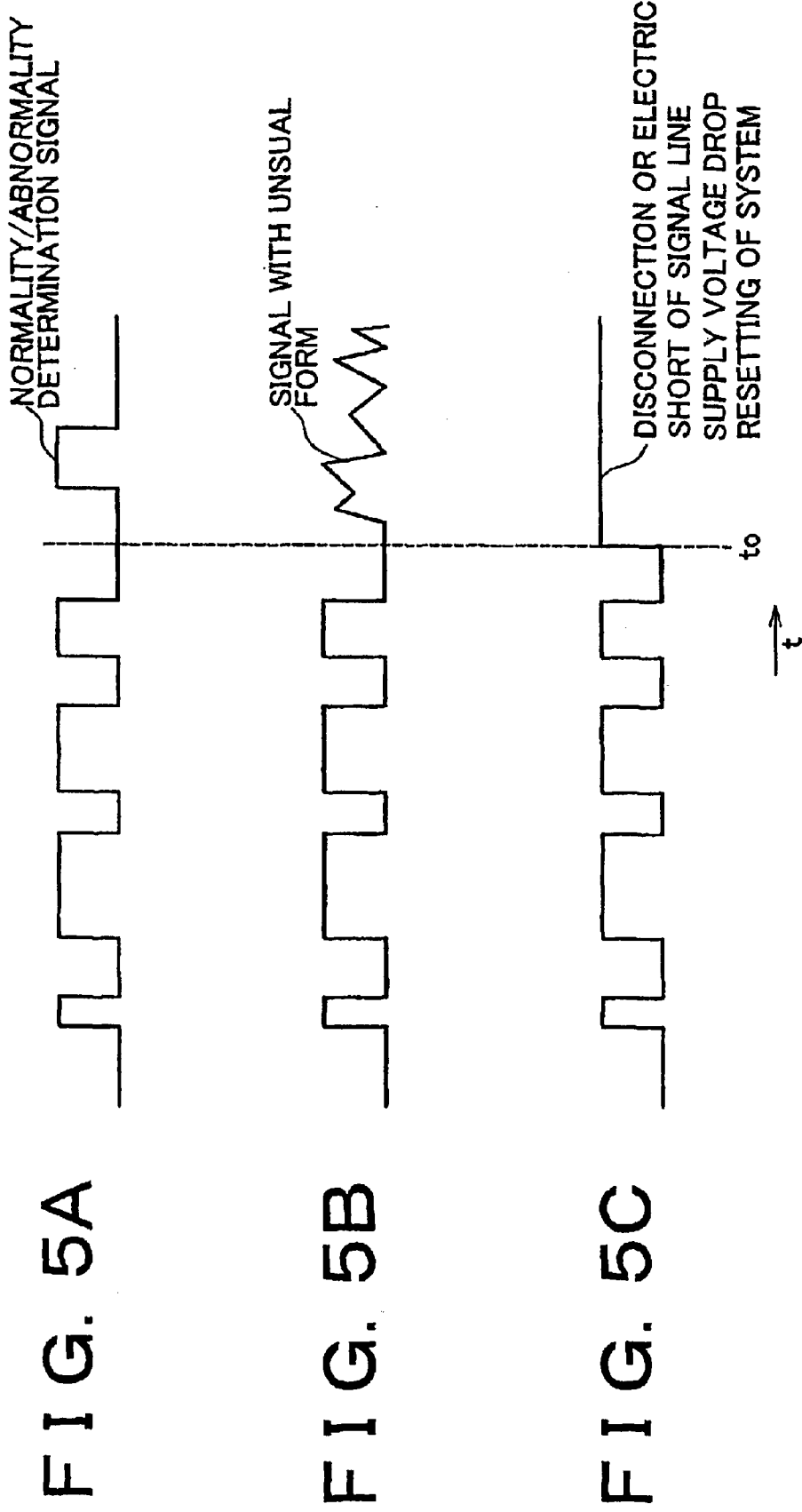
FIGS. 5A–5C are views illustrating abnormal conditions generated between satellite sensors and an electronic control unit (ECU)

FIGS. 5A–5C are explanatory views illustrating abnormal conditions generated between the satellite sensors 16, 18 and the ECU 12. Namely, FIGS. 5A–5C show waveforms of the output signals generated from the satellite sensors 16, 18, which are detected by the ECU 12. As shown in FIGS. 5A–5C, a certain abnormality occurs after the point of time t0. Referring to FIG. 5A, the normality/abnormality determination signal generated by the satellite sensors 16, 18 is detected. When the signal indicates abnormality of the satellite sensors 16, 18, the ECU 12 determines that the satellite sensors 16, 18 are in an abnormal state and immediately shifts the threshold-change-pattern for the currently selected one of the normal maps to the failsafe map.

As described above, each of the satellite sensors 16, 18 is adapted to output the level signal, the normality/abnormality determination signal and, subsequent to the output of these signals, a mirror signal symmetrical therewith. The ECU 12 determines that the output signal of the satellite sensors 16, 18 is a normal state if it coincides with the signal inverse to the mirror signal. Meanwhile, the ECU 12 determines that the output signal is abnormal if it does not coincide with the signal inverse to the mirror signal, representing possibility of a certain kinds of abnormality.

Referring to FIG. 5B, the output signal of the satellite sensors 16, 18 does not coincide with the signal inverse to the mirror signal, and the state in which the output signal randomly fluctuates continues for a long period of time. This shows the possibility of disturbance or distortion of the level signal due to noise or the like. As a result, it can be determined that the level signal should not be used for selecting the threshold-change-patterns. Referring to FIG. 5C, the output signal does not coincide with the signal inverse to the mirror signal, and the state in which the output signal after the point of time t0 has flatness continues for a long period of time. This shows the possibility of disconnection or the electrical short in the signal line between the satellite sensors 16, 18 and the ECU 12. As in the condition of FIG. 5B, it may be determined that the level signals should not be used for selecting the threshold-change-patterns.

According to the present embodiment, the satellite sensors 16, 18 output to the ECU 12 the level signals and the normality/abnormality determination signals at predetermined intervals, while the ECU 12 detects the output signals received from the satellite sensors 16, 18 at predetermined intervals. The ECU 12 detects the states in which a) the output signal of the satellite sensors 16, 18 does not coincide with the corresponding mirror signal, and the output signal randomly fluctuates, and b) the output signal of the satellite sensors 16, 18 does not coincide with the corresponding mirror signal, and the output signal has flatness, successively in a plurality of times each time the output signal is detected. In the above cases, the ECU 12 shifts the threshold-change-pattern from the currently selected normal map to the failsafe map, since the level signal should not be used for selecting the threshold-change-pattern. After the threshold-change-pattern is shifted to the failsafe map, when the state in which the output signal of the satellite sensors 16, 18 coincide with the corresponding mirror signal has continued for a predetermined period of time, it is determined that the level signal of the satellite sensor 16, 18 is considered to be available for selecting the threshold-change-pattern without causing any problems. Thus, the ECU 12 returns the threshold-change-pattern from the failsafe map to the appropriate one of the normal maps, when the ECU 12 continuously detects coincidence of the output signal with the corresponding mirror signal for a predetermined number of times.

Figure 6:
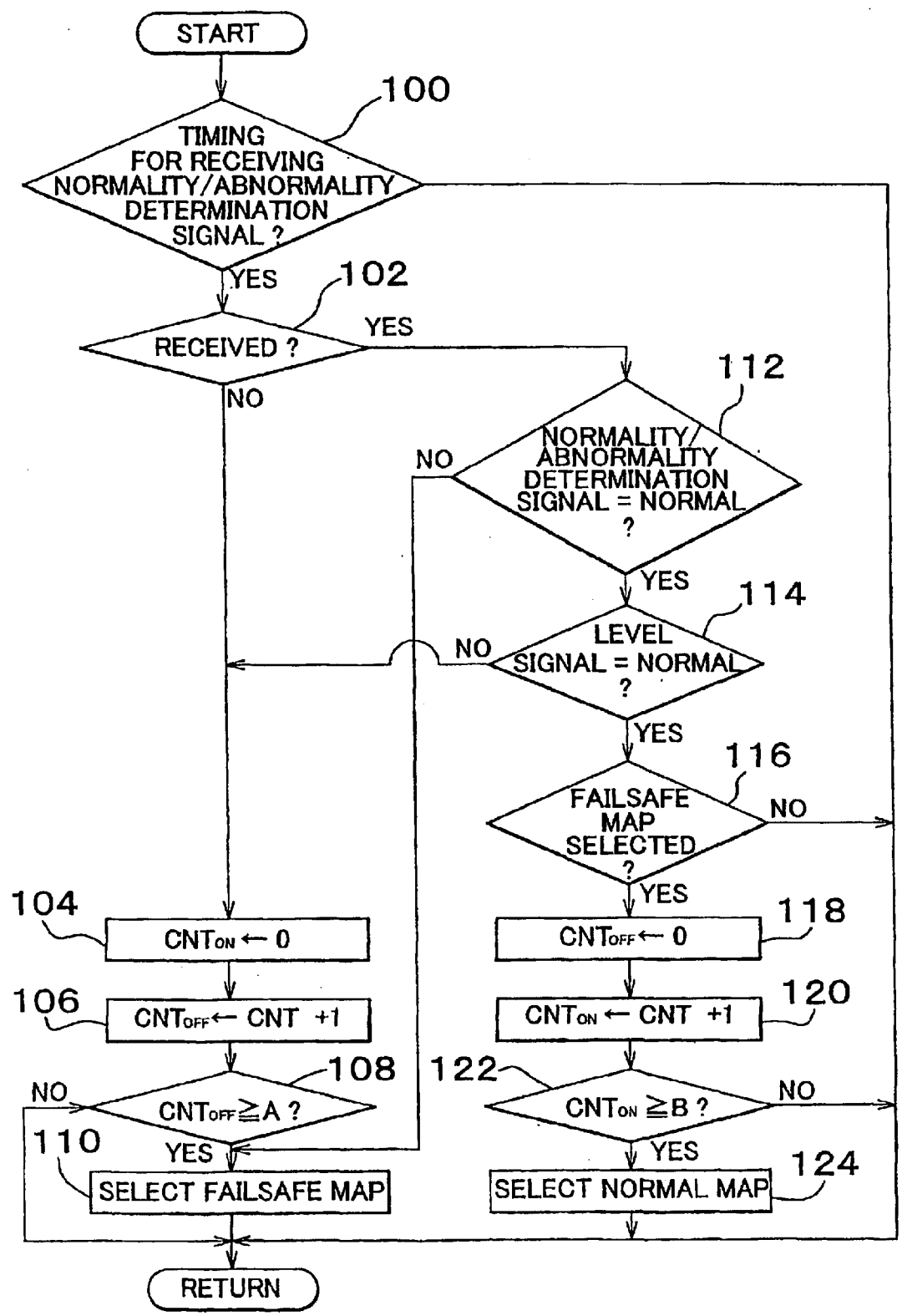
FIG. 6 is a flowchart showing a control routine executed by the ECU of FIG. 1, which routine is executed to shift the threshold-change-pattern from a selected one of normal maps to a failsafe map, and is executed to return the threshold-change pattern from the failsafe map to the appropriate one of the normal map.

FIG. 6 shows a flowchart illustrating an example of a control routine executed by the ECU 12 in the present embodiment. According to this control routine, the ECU 12 is operable to shift the threshold-change-pattern from the currently selected one of the normal maps to the failsafe map, and to return the threshold-change-pattern from the failsafe map to the appropriate one of the normal maps. This control routine is repeatedly started every time when one cycle of the routine is terminated. Upon the start of the control routine of FIG. 6, step S100 is executed.

In step S100, it is determined whether it is the time for receiving the output signal of the satellite sensors 16, 18 generated at a predetermined interval. In this respect, the ECU 12 preliminarily stores the predetermined time interval at which the satellite sensors 16, 18 generate normality/abnormality determination signals. If NO in step S100, the control routine of this cycle is terminated, executing no further process. If YES in step S100, on the other hand, step S102 is then executed.

In step S102, it is determined whether the normality/abnormality determination signals have been received from the satellite sensors 16, 18. If NO, that is, such signals have not been received, the satellite sensors 16, 18 may possibly suffer from the problem of drop in the supply voltage. Accordingly, the process proceeds to S104 to be executed.

In step S104, a failsafe-return counter $CNT_{ON}$, is reset to "0". The failsafe-return counter $CNT_{ON}$ is operable after the output signals of the satellite sensors 16, 18 become available so as to count the number of successive detection of the state in which output signals of the satellite sensors 16, 18 are available.

In step S106, the failsafe-shift counter $CNT_{OFF}$ is incremented. This failsafe-shift counter $CNT_{OFF}$ is operable after the output signals of the satellite sensors 16, 18 become unavailable so as to count the number of successive detection of the state in which output signals of the satellite sensors 16, 18 are unavailable. The length of time elapsing from the time point when output of the signals by the satellite sensors 16, 18 are unavailable is measured on the basis of the value of the counter variables of the failsafe-shift counter $CNT_{OFF}$ and the predetermined interval of output of the normality/abnormality signals of the satellite sensors 16, 18.

In step S108, it is determined whether the value of the failsafe-shift counter $CNT_{OFF}$ is not smaller than a target value "A". This target value "A" is a lower limit of the number of the successive detection of the unavailable output signals, to be counted after the output signals generated from the satellite sensors 16, 18 become unavailable. For instance, the predetermined value "A" is set to "20" in the present embodiment. If it is determined in step S108 that "$CNT_{OFF} \geq A$" is not established, the control routine of this cycle is terminated. If it is determined in step S108 that "$CNT_{OFF} \geq A$" is established, the process proceeds to step S110 to be executed.

In step S110, the failsafe map for the threshold-change-pattern is selected. In step S110, the threshold value SH obtained from the failsafe map is compared with the reference value determined by the relationship between the calculated value f(Gf) and the velocity Vn. Upon termination of the process in step S110, the current cycle of the control routine is terminated.

Meanwhile, if YES in step S102, that is, the normality/abnormality determination signals have been received, the process proceeds to step S112 to be executed.

In step S112, it is determined whether the normality/abnormality determination signal indicates the normal state of the satellite sensors 16, 18. If NO in step S112, the threshold-change-pattern should be immediately shifted to the failsafe map. Therefore, the process proceeds to step S110 in which the failsafe map is selected. If YES in step S112, on the other hand, the process proceeds to step S114 to be executed.

In step S114, it is determined whether the level signal of the satellite sensors 16, 18 coincide with the signal corresponding to the impact exerted to the front of the vehicle body. In other words, the plausibility of the signal level is determined. If NO in step S114, there is possibility that great noise is superposed on the level signals, or that the signal line connecting between the satellite sensors 16, 18 and the ECU 12 are disconnected. In the aforementioned case, the process proceeds to the aforementioned step S104. If YES in step S114, the process proceeds to step S116 to be executed.

In step S116, it is determined whether the failsafe map is being selected. If NO in step S116, it may be assumed that the threshold-change-pattern has been already determined according to a normal manner, and accordingly, there is no need to switch the threshold-change-pattern. Then the control routine of this cycle is terminated. Meanwhile, if YES in step S116, it may be possible to consider that the state of the output signal of the sensors 16, 18 has been switched to the available state. Then the process proceeds to S118 to be executed.

In step S118, the failsafe shift counter $CNT_{OFF}$ is initialized to "0".

Then in step S120, the failsafe-return counter $CNT_{ON}$, is incremented. That is, the failsafe-return counter $CNT_{ON}$ is operable after the output signals of the satellite sensors 16, 18 become available, to count the number of successive detections of the available output signals. The failsafe-return counter $CNT_{ON}$ is also operable to measure the time elapsing from the state in which the output signals of the satellite sensors 16, 18 become available, based on the value of the failsafe-return counter $CNT_{ON}$.

In step S122, it is determined whether the value of the failsafe-return counter $CNT_{ON}$ is not smaller than a target value "B". The target value "B" is a lower limit of the number of the successive detections of the state in which the output signals of the satellite sensors 16, 18 are available, at which the threshold-change pattern should be switched from the failsafe map to any one of the normal maps. For instance, the target value "B" may be set to "3" in the present embodiment. If NO in step S122, that is, "$CNT_{ON} \geq B$" is not established, the control routine of this cycle is terminated. If YES in step S122, that is, "$CNT_{ON} \geq B$" is established, the process proceeds to step S124.

In step S124, one of the normal maps including Hi-map, Lo1-map, Lo2-map and Lo3-map for the threshold-change-pattern is selected from the failsafe map on the basis of the decelerations $G_{SL}$, $G_{SR}$, detected based on the output signals of the satellite sensors 16, 18, according to the normal manner. When starting execution of step S124, the threshold value SH obtained from the selected normal map is compared with the reference value determined by the relationship between the calculated value f(Gf) and the velocity Vn. Upon termination of step S124, the current cycle of control routine is terminated.

According to the aforementioned control process of the present embodiment, one of the normal maps including Hi-map, Lo1-map, Lo2-map and Lo3-map is selected for the threshold-change-pattern. When the ECU 12 receives a normality/abnormality determination signal indicating the abnormal state of the satellite sensors 16, 18, the threshold-change-pattern may be shifted to the failsafe map immediately. In the similar state where one of the normal maps is selected, if the ECU 12 fails to receive the output signals of the satellite sensors 16, 18 at appropriate timings, or receives the signal which takes an unusual form that cannot be identified as the level signal, and such state is detected in a successive predetermined number of times (i.e., such state is detected and continued for a predetermined period of time), the threshold-change-pattern from the currently selected normal map may be shifted to the failsafe map.

As is apparent from the forgoing description, the airbag trigger control system of the present embodiment is capable of shifting the threshold-change-pattern to the failsafe map, not only when the normality/abnormality determination signals received from the satellite sensors 16, 18 indicate the abnormal state, but also when it is determined a certain abnormality occurs between the satellite sensors 16, 18 and the ECU 12. More specifically, the satellite sensors 16, 18 may become incapable of generating the signal due to drop in the supply voltage. Further, the satellite sensors 16, 18 may generate the signal failure due to noise, disconnection, or short-circuit in the wiring. Even in the aforementioned situations where the level signal of the satellite sensors 16, 18 cannot be used to set the threshold-change-pattern for triggering the airbag system 30, the threshold-change-pattern can be reliably shifted to the failsafe map. This makes it possible to appropriately execute the airbag trigger control.

According to the above-described procedures, after shifting the threshold-change pattern to the failsafe map, when the state in which signals output by the satellite sensors 16, 18 become available for setting the threshold-change-pattern successively continues in a predetermined number of times (for a predetermined period of time), the threshold-change-pattern may be returned to the normal maps selected from the Hi-map, the Lo1-map, the Lo2-map, and Lo3-map from the failsafe map.

In the present embodiment, when the satellite sensors 16, 18 are in the normal state, the threshold-change pattern may be reliably returned to the normal map from the failsafe map. This makes it possible to perform appropriate determination for triggering the airbag system 30.

In the illustrated embodiment, the floor sensor 14 corresponds to the above-indicated "first sensor", while the satellite sensors 16, 18 corresponding to the above-indicated "second sensor". The calculated value f(Gf) and velocity Vn, which are obtained by performing the predetermined calculation on the deceleration Gf detected on the basis of the output signal from the floor sensor 14 corresponds to the "control parameters." Further, the normality/abnormality determination signal corresponds to the predetermined signal, while the threshold value SH obtained from the failsafe map corresponds to the "given value".

In the airbag trigger control system of the illustrated embodiment, the ECU 12 is operable to apply the drive signal to the driver circuit 32 of the airbag system 30 via the input/output circuit 20, when the reference value, which is determined by the relationship between the calculated value f (Gf) and the velocities Vn obtained from the output signal of the floor sensor 14, exceeds the threshold value SH. This operation of the ECU 12 may embody the "trigger control system". The ECU 12 is operable to select and set an appropriate threshold-change-pattern from and to the Hi-map, the Lo1-map, the Lo2-map and the Lo3-map, on the basis of the decelerations $G_{SL}$, $G_{SR}$ detected on the basis of the output signals of the satellite sensors 16, 18, and to execute the above-described step S110. This operation of the ECU 12 may embody the "threshold value changing means". Further, the EMU 12 executes step Scud to thereby embody the "change canceling means".

In the illustrated embodiment, the satellite sensors 16, 18 are arranged to output their normality/abnormality determination signals at the fixed interval, and then the EMU 12 shifts the threshold-change-pattern to the failsafe map, on condition that the EMU 12 does not receive the output signals. The invention may otherwise be embodied such that, for instance, the satellite sensors 16, 18 are arranged to output signals which corresponds to the impact exerted to the front of the vehicle body to which start/stop bits are added. Then, the EMU 12 is arranged to shift the threshold-change-pattern to the failsafe map, on condition that the EMU 12 does not receive any bits.

While the threshold-change-pattern is selected from one of the Hi-map, the Lo1-map, the Lo2-map and the Lo3-map, in the illustrated embodiment, the invention is not particularly limited, provided that the threshold-change-pattern is selectable from at least two maps.

What is claimed is:

1. An airbag trigger control system, comprising:

a first sensor which is disposed in a predetermined position in a vehicle body and outputs a signal corresponding to an impact exerted to the vehicle body;

a trigger control system which triggers an airbag when a parameter determined on the basis of the signal output from the first sensor exceeds a predetermined threshold value;

a second sensor which is disposed forward of the first sensor in the vehicle body and outputs a signal corresponding to an impact exerted to the vehicle body; and a threshold value changing device which changes the predetermined threshold value in accordance with the signal output by the second sensor; wherein the second sensor outputs a predetermined signal at predetermined intervals, and the threshold value changing device changes the predetermined threshold value to a given value when the output signal of the second sensor is not detected in a predetermined number of successive control cycles, comprising a change canceling device which cancels a change of the threshold value to the given value when the output signal of the second sensor is detected in a predetermined number of successive control cycles after the threshold value changing device changed the predetermined threshold value to the given value.

2. The airbag trigger control system according to claim 1, further comprising an abnormality determination device which determines an abnormality in the output signal of the second sensor each time the output signal is detected, wherein the threshold value changing device changes the predetermined threshold value to the given value when the abnormality in the output signal of the second sensor is detected by the abnormality determination device in a predetermined number of successive control cycles.

3. The airbag trigger control system according to claim 2, further comprising a change canceling device that cancels a change of the predetermined threshold value to the given value when the abnormality in the output signal of the second sensor is not detected by the abnormality determination device in a predetermined number of successive control cycles after the threshold value changing device changed the predetermined threshold value to the given value.

4. The airbag trigger control system according to claim 1, further comprising an abnormality determination device which determines an abnormality from a signal indicative of an abnormal/ abnormal state of the second sensor in the output signal of the second sensor each time the output signal is detected, wherein the threshold value changing device immediately changes the predetermined threshold value to the given value when the abnormal state of the second sensor is detected by the abnormality determination device, and a change canceling device that cancels a change of the predetermined threshold value to the given value when the abnormal state of the second sensor is not detected by the abnormality determination device in a predetermined number of successive control cycles after the threshold value changing device changed the predetermined threshold value to the given value.

5. An airbag trigger control system, comprising:

a first sensor which is disposed in a predetermined position in a vehicle body and outputs a signal corresponding to an impact exerted to the vehicle body;

a trigger control system which triggers an airbag when a parameter determined on the basis of the signal output from the first sensor exceeds a predetermined threshold value;

a second sensor which is disposed forward of the first sensor in the vehicle body and outputs a signal corresponding to an impact exerted to the vehicle body;

a threshold value changing device which changes the predetermined threshold value in accordance with the signal output by the second sensor; wherein the second sensor outputs a predetermined signal at a predetermined interval, and the threshold value changing device changes the predetermined threshold value to a given value when the output signal of the second sensor is not detected for a predetermined period of time, comprising a change canceling device which cancels a change of the threshold value to the given value when the output signal of the second sensor is detected for a predetermined period of time after the threshold value changing device changed the predetermined threshold value to the given value.

6. The airbag trigger control system according to claim 5, further comprising an abnormality determination device which determines an abnormality in the output signal of the second sensor each time the output signal is detected, wherein the threshold value changing device changes the predetermined threshold value to the given value when the abnormality in the output signal of the second sensor is detected by the abnormality determination device for a predetermined period of time.

7. The airbag trigger control system according to claim 6, further comprising a change canceling device that cancels a change of the predetermined threshold value to the given value when the abnormality in the output signal of the second sensor is not detected by the abnormality determination device for a predetermined period of time.

8. The airbag trigger control system according to claim 5, further comprising an abnormality determination device which determines an abnormality from a signal indicative of an abnormal/normal state of the second sensor in the output signal of the second sensor each time the output signal is detected, wherein the threshold value changing device changes the predetermined threshold value immediately to the given value when the abnormal state of the second sensor is detected by the abnormality determination device, and a change canceling device that cancels a change of the predetermined threshold value to the given value when the abnormal state of the second sensor is not detected by the abnormality determination device for a predetermined period of time.

9. An airbag trigger control system, comprising:

a first sensor which is disposed in a predetermined position in a vehicle body and outputs a signal corresponding to an impact exerted to the vehicle body;

a trigger control system which triggers an airbag when a parameter determined on the basis of the signal output from the first sensor exceeds a predetermined threshold value;

a second sensor which is disposed forward of the first sensor in the vehicle body and outputs a signal corresponding to an impact exerted to the vehicle body;

a threshold value changing device which changes the predetermined threshold value in accordance with the signal output by the second sensor;

an abnormality determination device which determines an abnormality in the output signal of the second sensor each time the output signal is detected, wherein the threshold value changing device changes the predetermined threshold value to the given value when the abnormality in the output signal of the second sensor is detected by the abnormality determination device in a predetermined number of times or for a predetermined period of time, further comprising a change canceling device which cancels a change of the threshold value to the given value when the abnormality in the output signal of the second sensor is detected by the abnormality determination device in a predetermined number of times or for a predetermined period of time after the threshold value changing device changed the predetermined threshold value to the given value.

* * * * *